(12) United States Patent
Auld et al.

(10) Patent No.: US 10,706,305 B2
(45) Date of Patent: *Jul. 7, 2020

(54) METHOD AND SYSTEM FOR REPLAYING A VOICE MESSAGE AND DISPLAYING A SIGNED DIGITAL PHOTOGRAPH CONTEMPORANEOUSLY

(71) Applicant: Autography LLC, St. Petersburg, FL (US)

(72) Inventors: David Auld, Seattle, WA (US); Erem Boto, Seattle, WA (US); William Chan, Seattle, WA (US); Eric Feeny, Seattle, WA (US); Andrew Smith, Seattle, WA (US); Thomas J. Waters, St. Petersburg, FL (US); Robert N. Barrett, St. Petersburg, FL (US)

(73) Assignee: Autography LLC, St. Petersburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/535,571

(22) Filed: Aug. 8, 2019

(65) Prior Publication Data
US 2019/0362170 A1 Nov. 28, 2019

Related U.S. Application Data

(63) Continuation of application No. 15/978,613, filed on May 14, 2018, now abandoned, which is a
(Continued)

(51) Int. Cl.
*G06K 9/00* (2006.01)
*G06Q 30/00* (2012.01)
(Continued)

(52) U.S. Cl.
CPC .......... *G06K 9/00892* (2013.01); *A63B 71/06* (2013.01); *G06K 9/00161* (2013.01);
(Continued)

(58) Field of Classification Search
CPC .............. A63B 71/06; G06K 9/00161; G06K 9/00194; G06K 9/00281; G06K 9/00288;
(Continued)

(56) References Cited

U.S. PATENT DOCUMENTS 7,143,290 B1 11/2006 Ginter et al.
9,141,959 B2 9/2015 Auld et al.
(Continued)

*Primary Examiner* — Edward Park
(74) *Attorney, Agent, or Firm* — Shumaker, Loop & Kendrick, LLP

(57) ABSTRACT

Systems and methods for generating authentic digital memorabilia are described. A signor may be provided a digital photograph. The signor's signature, written message, or voice message may be received. Biometric authentication or verification may be performed on the signor's handwriting or voice sample through comparison with stored samples. If the verification signifies a high likelihood signor's handwriting or voice sample is authentic, creation of digital memorabilia is performed by embedding signor's signature or written message in a digital photograph and linking the signor's voice message with the photograph. The digital memorabilia is accompanied by a certificate of authenticity and distributed to a customer or displayed on a website.

5 Claims, 16 Drawing Sheets

Related U.S. Application Data continuation of application No. 14/826,783, filed on Aug. 14, 2015, now abandoned, which is a continuation of application No. 13/683,247, filed on Nov. 21, 2012, now Pat. No. 9,141,959.

(60) Provisional application No. 61/564,552, filed on Nov. 29, 2011.

(51) Int. Cl.
| | |
|---|---|
| *H04L 29/06* | (2006.01) |
| *H04L 29/08* | (2006.01) |
| *G10L 17/00* | (2013.01) |
| *A63B 71/06* | (2006.01) |
| *H04L 9/32* | (2006.01) |

(52) U.S. Cl.
CPC ..... *G06K 9/00194* (2013.01); *G06K 9/00281* (2013.01); *G06K 9/00288* (2013.01); *G06K 9/00416* (2013.01); *G06K 9/00744* (2013.01); *G06K 9/00899* (2013.01); *G06Q 30/018* (2013.01); *G06Q 30/0185* (2013.01); *G10L 17/005* (2013.01); *H04L 9/3231* (2013.01); *H04L 9/3247* (2013.01); *H04L 63/0884* (2013.01); *H04L 63/12* (2013.01); *H04L 67/10* (2013.01); *H04L 2209/56* (2013.01)

(58) Field of Classification Search
CPC ........... G06K 9/00416; G06K 9/00744; G06K 9/00899; G06Q 30/018; G06Q 30/0185
See application file for complete search history.

(56) References Cited

U.S. PATENT DOCUMENTS

| | | | |
|---|---|---|---|
| 9,558,416 | B2 | 1/2017 | Waters et al. |
| 9,818,123 | B2 | 11/2017 | Waters et al. |
| 2003/0135740 | A1 | 7/2003 | Talmor et al. |
| 2004/0007870 | A1 | 1/2004 | Ueno |
| 2005/0125337 | A1 | 6/2005 | Tidwell et al. |
| 2005/0257045 | A1 | 11/2005 | Bushman et al. |
| 2009/0025090 | A1 | 1/2009 | Clement et al. |
| 2010/0289940 | A1 | 11/2010 | Toguchi |
| 2011/0107433 | A1 | 5/2011 | Steelberg et al. |
| 2011/0208655 | A1 | 8/2011 | Steelberg et al. |
| 2013/0106981 | A1 | 5/2013 | Tsai et al. |
| 2013/0117665 | A1 | 5/2013 | Tagliaferri et al. |
| 2013/0132230 | A1 | 5/2013 | Gibson et al. |
| 2014/0032371 | A1 | 1/2014 | Traina et al. |
| 2015/0356363 | A1 | 12/2015 | Auld et al. |
| 2016/0171580 | A1 | 6/2016 | Waters et al. |
| 2018/0060879 | A1 | 3/2018 | Waters et al. |
| 2018/0268231 | A1 | 9/2018 | Auld et al. |
| 2018/0367314 | A1* | 12/2018 | Egner et al. |

\* cited by examiner

METHOD AND SYSTEM FOR REPLAYING A VOICE MESSAGE AND DISPLAYING A SIGNED DIGITAL PHOTOGRAPH CONTEMPORANEOUSLY

CROSS-REFERENCE TO RELATED APPLICATIONS

This application claims the priority benefit of U.S. provisional application No. 61/564,552, filed Nov. 29, 2011 and titled, "Method to Provide Digital Memorabilia Utilizing Biometric Verification," which is incorporated by reference herein.

BACKGROUND

Field of the Invention

The present invention relates generally to digital memorabilia, and more particularly, to digital memorabilia that feature both a voice message and a signed digital photograph to a receiver of the digital memorabilia.

Background Art

Celebrities attempt to monetize their "fame" (e.g., their talent, access, status, attention, etc.) in a variety of ways. These ways can include the creation of content, such as signed memorabilia, etc. Markets for celebrity memorabilia, e.g., signed sports equipment, autographed cards, jerseys, pictures, etc., have developed over the years. However, despite the availability of companies that evaluate and certify memorabilia, an ever-present danger of fraud still exists. Such memorabilia fraud can discourage fans from purchasing celebrity memorabilia.

In light of the above, there exists a need for an effective and low-maintenance system and method to ensure authenticity of celebrity memorabilia.

SUMMARY

The present technology provides a method for generating digital memorabilia, which may advantageously feature both replaying of a voice message and displaying of a signed digital photograph to the receiver of digital memorabilia. The replaying of a voice message and displaying of a signed digital photograph may occur contemporaneously. This technique provides a more personalized digital autograph experience to the receiver of digital memorabilia. This technique also provides for the authentication of the signor (e.g., the celebrity) of digital memorabilia.

In one embodiment, a non-transitory computer readable storage medium having embodied thereon a program, the program being executable by a computer to perform a method for generating digital memorabilia is provided. The method may include providing the signor of the digital memorabilia with a digital photograph, receiving a voice message and at least one of an electronic signature and an electronic written message from the signor of the digital memorabilia, the voice message and the at least one of an electronic signature and an electronic written message associated with the digital photograph, embedding the at least one of an electronic signature and an electronic written message into the digital photograph, and delivering the digital photograph with the voice message and the embedded at least one of an electronic signature and an electronic written message to the receiver of the digital memorabilia.

In another embodiment, a method for enrolling the signor of digital memorabilia is provided. The method may include receiving information from the signor, the information associated with creating an account for the service for generating digital memorabilia, creating an account for the signor, receiving identification data from the signor in order to confirm the identity of the signor, initiating the biometric verification workflow, verifying the identity of the signor through at least one of an in-person meeting and a remote meeting, receiving at least one voice sample and at least one handwriting sample from the signor, and utilizing the at least one voice sample and the at least one handwriting sample to authenticate the identity of the signor.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Figure 1:
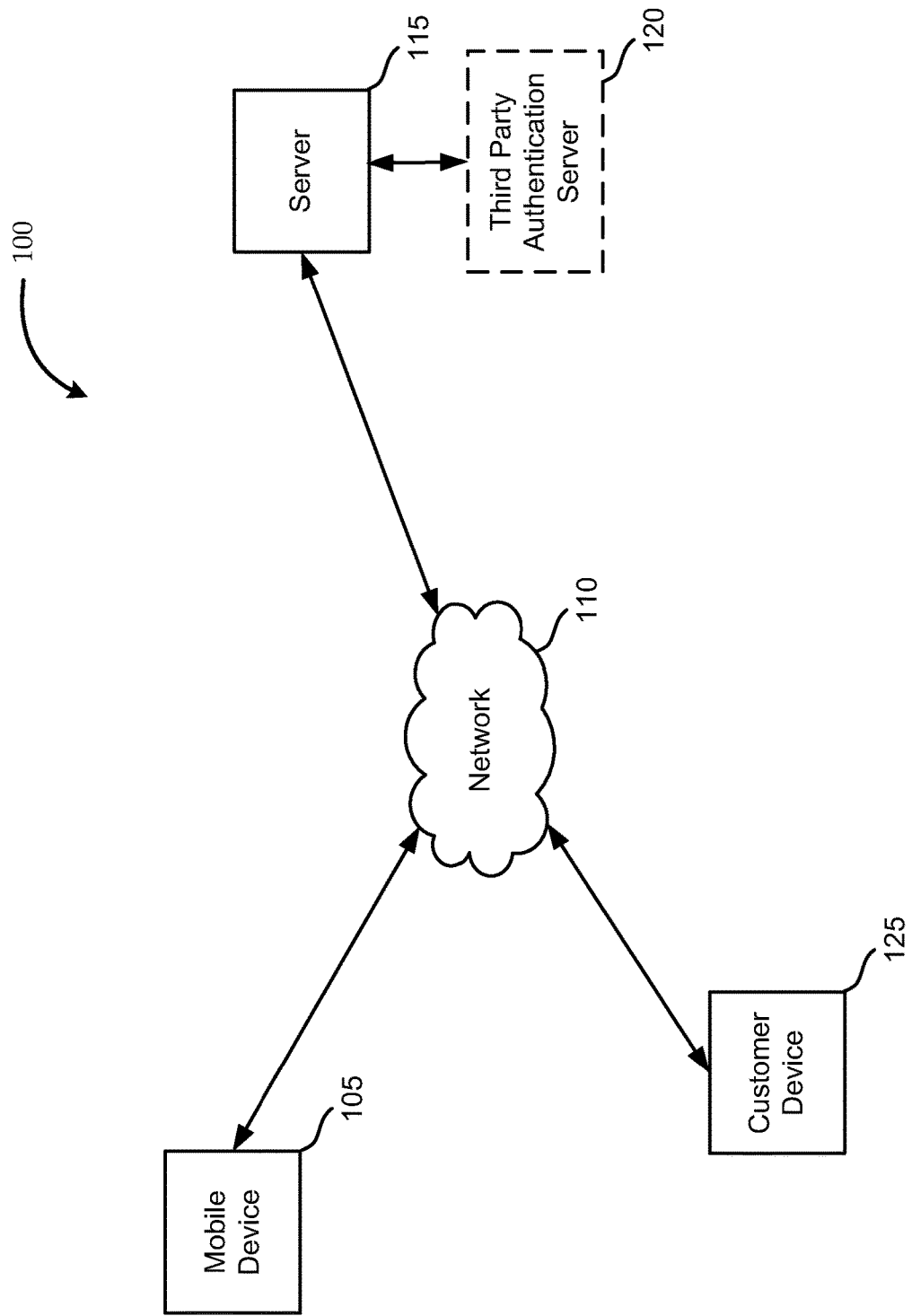
FIG. 1 illustrates a block diagram of an exemplary environment of the invention.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Despite the demand for celebrity memorabilia, the creation of "content", i.e., the media and athletic entertainment for which a celebrity is known, is a time consuming process. Content creation typically involves appearances and signings, endorsements, or personally branded products. These channels may involve high risk, heavy manual intensity, high upfront costs and commitments or a combination thereof. Using a digital channel may present advantages over the traditional channels such as instantaneous fan connection, new scenarios for fans and celebrities to interact, and scalability. Moreover, the digital channel may allow for fans to purchase fame on demand through an online marketplace, through digital memorabilia.

Generally speaking, the present technology may be directed to a method and system for generating digital memorabilia, which may advantageously feature both replaying of a voice message and displaying of a signed digital photograph to the receiver of digital memorabilia. According to some embodiments the present technology may employ a server to assist in generating, processing and tracking requests for digital memorabilia and storing the digital memorabilia for access by the receiver. Mobile devices may be used by a celebrity to generate the digital memorabilia and assist in accurately authenticating the celebrity remotely. These and other embodiments of the present technology will be described in greater detail below.

As defined herein, a digital memorabilia signor may be any person who generates digital memorabilia. A digital memorabilia signor may be referred to herein as a signor, celebrity, or athlete.

FIG. 1 is a block diagram of an exemplary environment 100 for a digital memorabilia system. The environment 100 may include a mobile device 105, a network 110, a server 115, an optional third party authentication or verification server 120, and a customer device 125. The mobile device 105 may be a tablet (e.g., an iPad or other similar device with a touchscreen), for use by a celebrity or signor to autograph digital memorabilia. The mobile device 105 may also be used to capture biometric data for authorization. The mobile device 105 may connect to a network 110, either wired or wirelessly through use of a router, modem, cellular technologies, or other similar technology. The network 110 can include any type of data communication network, including an intranet, the Internet, a LAN, WAN, public network, private network, and any combination of these.

A server 115 may communicate with the mobile device 105 through the network 110. The server 115 may receive and store the digital memorabilia from the mobile device 105 and display it on a website. The server 115 may also receive and store biometric data captured or recorded by the mobile device 105. Optionally, the server may send the biometric data received to a third party authentication or verification server 120 for analysis or authentication. Alternatively, authentication or verification may be performed by server 115. The server 115 may perform additional functions which are described in detail below.

A customer device 125 (e.g., a tablet, phablet, computer, smartphone, etc.) may communicate with the server 115 through the network 110. The customer device 125 may view the digital memorabilia at a website hosted by the server 115. The customer device 125 may also place orders or requests for digital memorabilia.

Figure 2:
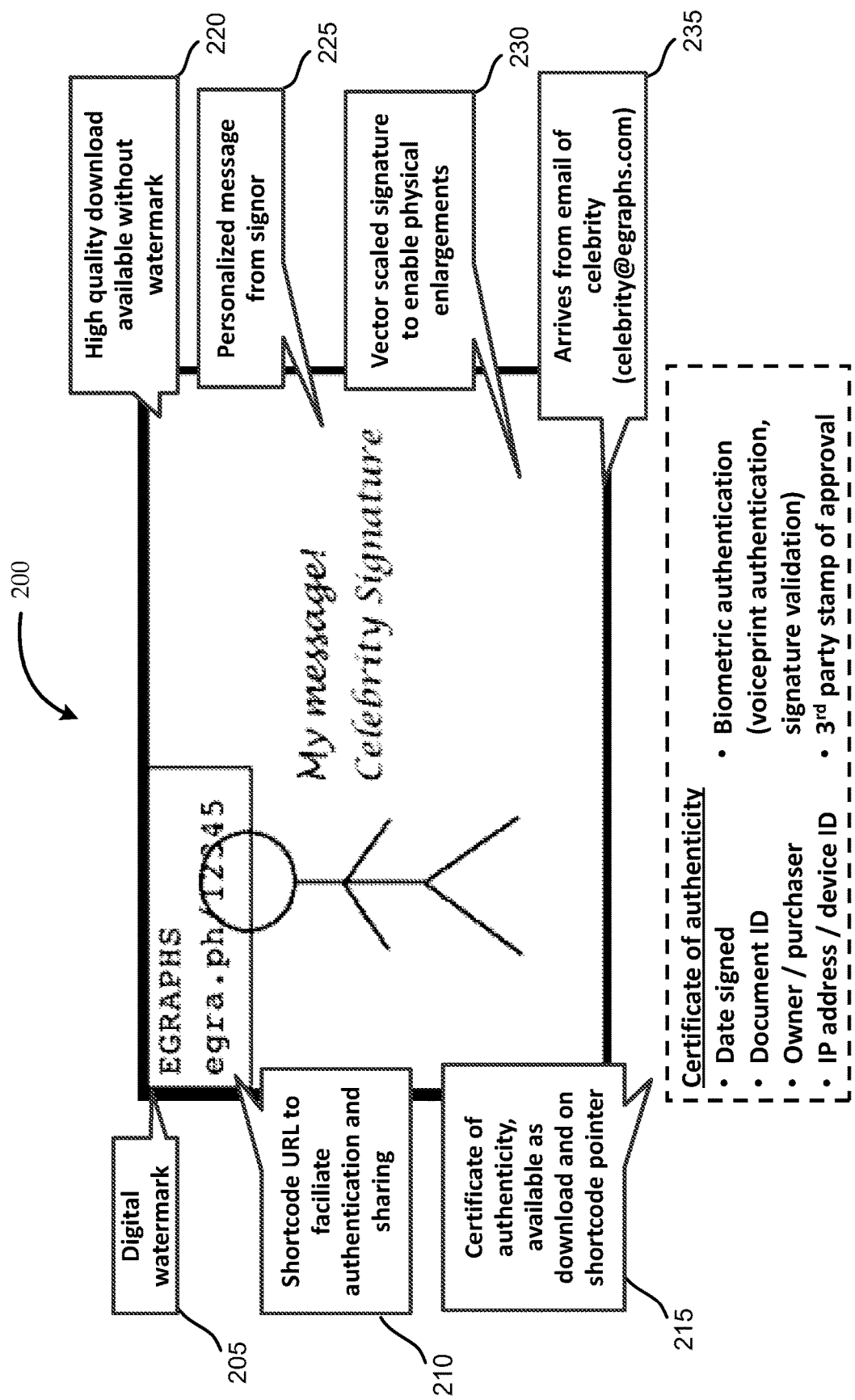
FIG. 2 illustrates an exemplary embodiment of the invention.

FIG. 2 illustrates an exemplary embodiment of digital memorabilia 200. The digital memorabilia 200 may include a digital item (e.g., a digital photo of the celebrity, a customer-provided photo, etc.). Optionally, a digital watermark 205 may be embedded into the digital item. The digital watermark 205 may indicate the origin of the digital item, the authenticity of the item, etc. An optional Universal Resource Locator (URL) 210 may be included with the digital watermark 205. The URL 210 may be a shortcode URL 210 to facilitate authentication of the digital memorabilia. The shortcode URL 210 may also facilitate sharing of the digital memorabilia (e.g., through email, social networks (Twitter, Facebook, etc.), text messages, websites, etc.) Alternatively, the shortcode URL 210 may be separate from the digital watermark.

The digital memorabilia 200 may also include or be associated with a certificate of authenticity 215. The certificate of authenticity 215 may be displayed with the digital memorabilia 200 when viewed at the URL 210 or available as a download. The certificate of authenticity 215 may serve as a verified chain of custody for the digital memorabilia. The certificate of authenticity 215 may include information such as timestamps (e.g., the date and time at which the digital memorabilia was purchased, the date and time at which the digital memorabilia was signed by the celebrity, the date and time the digital memorabilia was verified or approved, or the date and time at which the digital memorabilia was received), the unique document identification of the digital memorabilia, the owner (e.g., the purchaser or customer) information (e.g., email, name, etc.), ownership history of the digital memorabilia, the internet protocol (IP) address or device identification (ID) of the signor's device, information of the biometric authentication of the signor, a real time redrawing of the signature or message, or a third party stamp of approval.

Optionally, the digital memorabilia 200 may be available for download 220 through the shortcode URL 210 without the digital watermark 205.

In one embodiment, the digital memorabilia 200 may include an optional personalized message 225 from the signor (e.g., the celebrity). The personalized message 225 may be a requested message by the customer.

The digital memorabilia 200 may include the autograph or signature 230 of the celebrity. A stylus or other input device may be used to enter the signature 230. The signature 230 may be digitally sampled or interpolated and sharpened or neatened. An example of digital sampling may be to record the X, Y coordinates and the time at which the coordinates were captured. The digital sampling and sharpening may occur on the mobile device for the signor to view. Optionally, a server may perform the neatening each time the digital memorabilia 200 is displayed. The data underlying the signature may be stored separately from the photo, allowing for vector scaling of the signature 230 to enable physical enlargements. The separate storage may allow for vector scaling independent from the digital image. Optionally the signature 230 may be scaled at a fixed aspect ratio in relation to the digital image.

The digital memorabilia 200 may optionally include an audio message recorded by the celebrity to the owner. The audio message may be accessed through the URL 210.

After the celebrity has completed personalizing the digital memorabilia, the digital memorabilia may be automatically sent 235 to the owner from the email of the celebrity (e.g., celebrity @egraphs.com).

In one embodiment, the digital memorabilia may be comprised of four parts or layers: (1) a digital photo layer, (2) a digital signature and message capture layer, (3) a unique voiceprint, and (4) a certificate of authenticity. Each layer may be separately stored to allow for adjustments in recreating the digital memorabilia. The digital memorabilia may be stored in a server and accessible through a URL.

Figure 3:
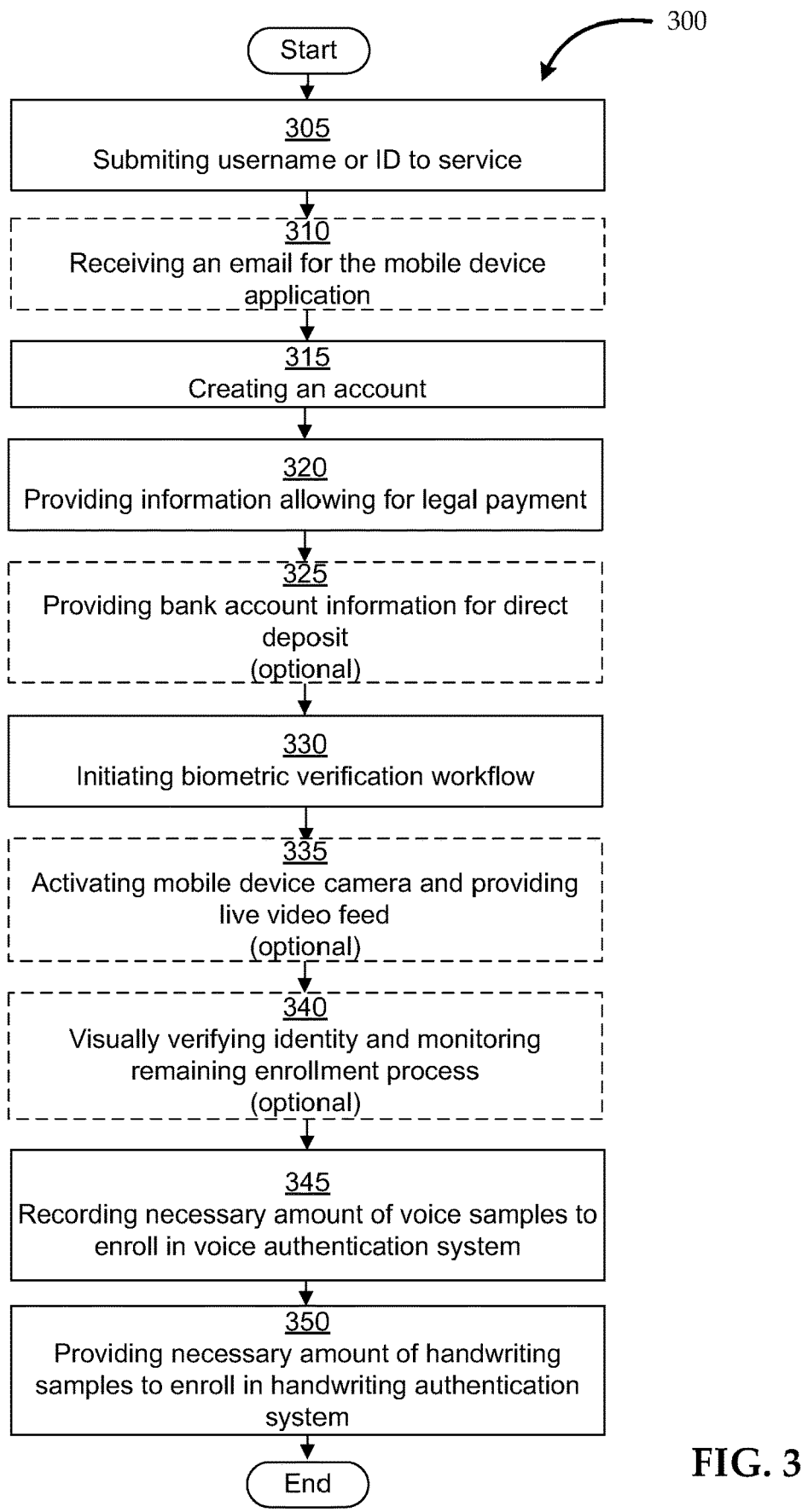
FIG. 3 illustrates a flow diagram of an exemplary enrollment method in accordance with the invention.

FIG. 3 illustrates an exemplary method 300 for enrolling signors or celebrities in a system for digital memorabilia. The celebrity may submit their username or identification to the digital memorabilia system in step 305. The username or identification may be associated with a signor's mobile or electronic device. In an optional step 310 the celebrity may receive at a verified email address an email link to download a mobile device application. Alternatively, the celebrity may obtain the mobile device application through an online application store (e.g., Apple's App Store, Google Play, Amazon App Store, etc.). Once the application is received, the celebrity may create an account through the mobile device application at step 315. In step 320, the celebrity provides the necessary legal identification (e.g., Social Security number) to confirm their identity or ensure the signor may be legally paid. In optional step 325, the celebrity may provide their banking information to support direct deposit of earnings. Such earnings are associated with the signor generating digital memorabilia. The celebrity may then initiate the biometric verification process at step 330, as described in detail below. In optional step 335, a camera on the mobile device may be activated by the application to provide live video feed to a server, allowing the celebrity's identity to be visually verified and monitored during the remaining enrollment process at optional step 340. Optionally, the signor's identity may be verified through an in-person meeting.

In step 345, the celebrity records the necessary amount of voice samples to enroll in a voice authentication system. The voice samples may be captured by the mobile device's onboard microphone. The necessary amount of voice samples may be at least one voice sample to any number required to serve as a sufficient baseline of biometric data for authenticating the celebrity or signor's voice. For example, 5 to 10 voice samples may be recorded. The voice authentication system may use standard voiceprint analysis to identify the speaker. Such a system may take the full fidelity audio file recorded and break down the recording to analyze amplitude and frequency of certain vocal characteristics. The analysis allows for statistical comparison between the previously accepted samples, or baseline and new samples recorded by the celebrity. Optionally, newly accepted samples may also be analyzed to add to the accuracy of future voice recordings. The voice authentication or verification system may be run by third parties or performed by the digital memorabilia system.

In step 350, the celebrity provides the necessary amount of handwriting samples to enroll in a handwriting authentication or verification system. The necessary amount of handwriting samples may include at least one sample to any number required by the handwriting authentication system to serve as a sufficient baseline of biometric data for authenticating the celebrity or signor's handwriting or signature. For example, 10 to 15 signatures may be recorded. The handwriting samples may be recorded using a stylus on the mobile device, allowing the mobile device to capture stylus touch events at a defined frequency. Such touch events may include recording input positions in X, Y, coordinates and the timestamp of each event. The input may be stored as an array of X, Y, time coordinates and sent from the device to a server. A statistical comparison of the velocity between points, relative position of points, and proprietary writing indicators, such as the width of certain loops, may be used to assess the authenticity of the signature. Verified signatures may be used to add to the accuracy of future signatures. The handwriting authentication or verification system may be run by third parties or performed by the digital memorabilia system. Once the method ends, the celebrity or signor is authenticated for remote digital memorabilia signing and additional video verification is optional.

In the above method, the handwriting authentication may reach a confidence level of 90%. Similarly, the voice authentication may also reach a confidence level of 90%. The combination of the confidence levels may reach a confidence level of 99% that the signor is the celebrity.

While the above embodiment may utilize two non-invasive forms of verification to authenticate the identification of the celebrity or signor, other forms of biometric authentication may be used. Such biometric authentication may comprise facial recognition (e.g., through camera or video), fingerprint recognition, handprint recognition, iris recognition, retina recognition, or other similar forms of non-invasive identification. Similar methods of gathering the baseline data for each form of identification may be used as described above.

Figure 4:
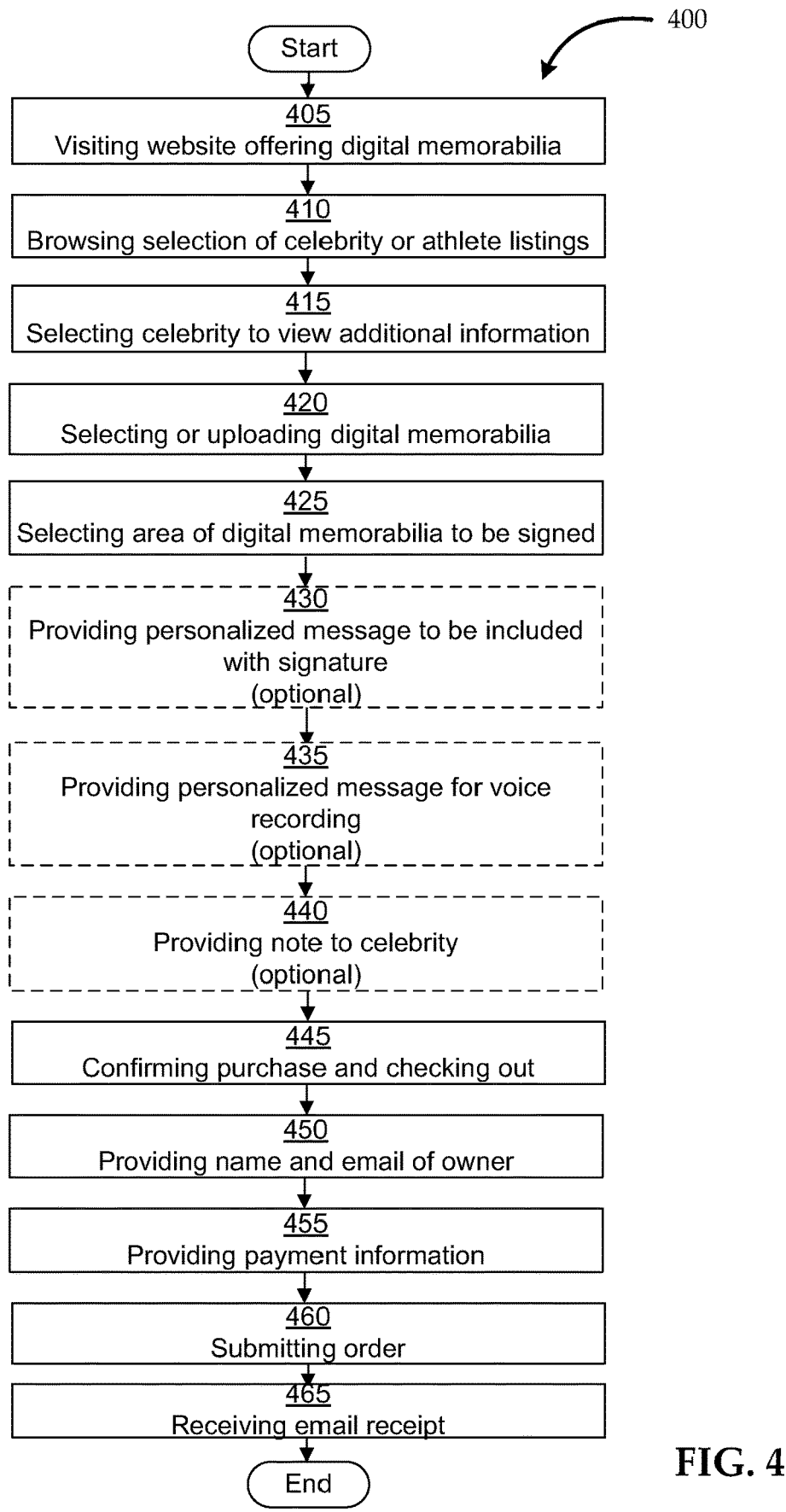
FIG. 4 illustrates a flow diagram of an exemplary method for purchasing digital memorabilia.

FIG. 4 illustrates an exemplary method 400 for purchasing digital memorabilia. A customer may visit a website offering digital memorabilia in step 405. At step 410, the customer may browse selection of celebrity or athlete listings. The customer may select a given celebrity to view further information of available digital items (e.g., professional digital photographs of the celebrity, images, etc.) or be allowed to upload a digital item of the customer's choice at step 415. Once the customer selects or uploads a digital item, the customer may proceed to step 420 to select the area where they would like the photo to be signed by the celebrity. Optionally at step 430, the customer may add a personalized message for the celebrity to include on the digital memorabilia. Optionally, the customer may add a personalized message for the celebrity to include in a voice recording in step 435. The customer may optionally include a note to the celebrity at step 440. The optional note will not be written on the digital memorabilia or stored in a voice recording. The customer confirms the purchase and begins the checkout process in step 445. At step 450, the customer enters the name and email address of the intended owner or receiver of the digital memorabilia. The customer enters their payment information at step 455. In step 460, the customer submits order and receives a confirmation screen. At step 465, the customer receives an email receipt of the order.

Figure 5:
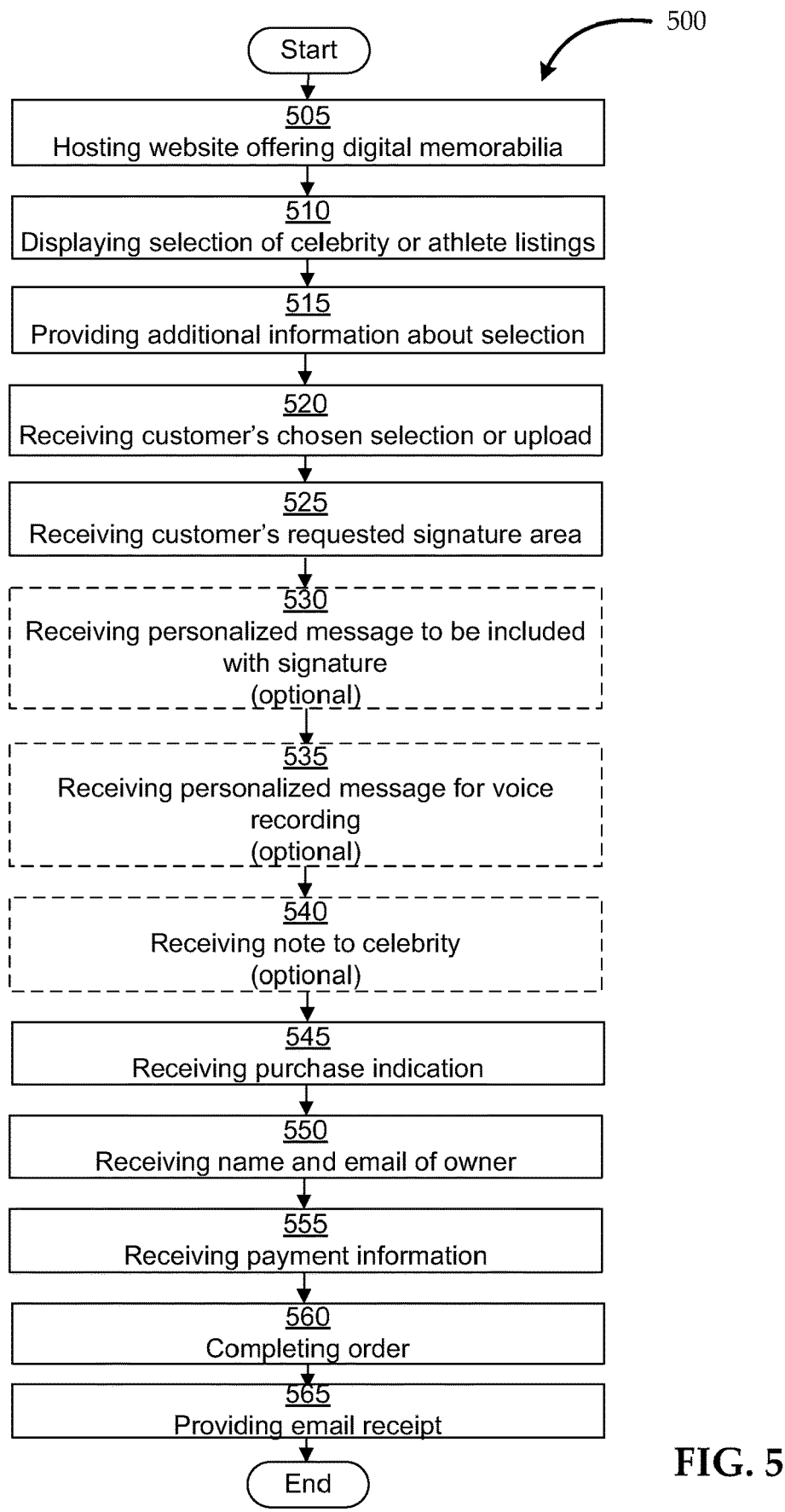
FIG. 5 illustrates a flow diagram of an exemplary process for receiving orders for digital memorabilia.

FIG. 5 is a flowchart of another embodiment illustrating a method 600 of purchasing of digital memorabilia. A server 105 hosts a website accessible by the public offering digital memorabilia in step 505. In step 510, the website may provide a selection of celebrity and athlete listings. At step 515, the website may display additional information about a given celebrity at the request of a customer or user (e.g. available digital items such as professional photographs, images, etc.) or receive an uploaded digital item from the customer. In step 520, the website receives a customer's chosen selection or upload. At step 525, the website may receive a customer's requested signature location on the digital memorabilia. At optional step 530, the website may receive a customer's request for a personalized message for the celebrity to include on the digital memorabilia. In optional step 535, the website may receive a customer's request for a personalized message for the celebrity to record. At optional step 540, the website may receive a customer's note to be provided to the celebrity. In step 545, the customer confirmation of the purchase is received and the checkout process begins. At step 550, the name and email of the intended receiver of the digital memorabilia is received from the customer. In step 555, the customer's payment information is received (e.g., credit card, gift card, debit card, etc.). At step 560, the customer's submission of the completed order is received and a confirmation screen is provided. An email receipt of the digital memorabilia order is provided to the customer in step 565.

In one embodiment of the present invention, the interaction between celebrities and fans or customers may be monitored, herein "monitored interaction." Such monitoring may serve to protect the celebrities, the fans, or both from harm, damage to reputation, etc. The monitoring may include screening the content of submitted digital memorabilia orders. The screening may identify unapproved content, such as profanity, racism, verbal abuse, unauthorized images, etc. Optionally a tiered screening method or system may be used. One tier may identify content that will be strictly prohibited and rejected (e.g., verbal abuse, racism, bigotry, etc.) Another tier may allow the celebrity or signor to personalize settings for their preference to allow certain interaction (e.g., profanity, offensive language or images, etc.). In another embodiment, pattern recognition or data mining may be used to adapt or modify the monitored interaction to the celebrity's preference. Such pattern recognition or data mining may include information received from celebrity's rejection of digital memorabilia order as described below. The monitored interaction may optionally be applied to screen the finished digital memorabilia from the celebrity. The monitored interaction may be automated or partially automated (e.g., a monitoring program running on a server). Optionally, the monitored interaction may flag content for further review by a human (e.g., content that may be considered borderline offensive).

Figure 6:
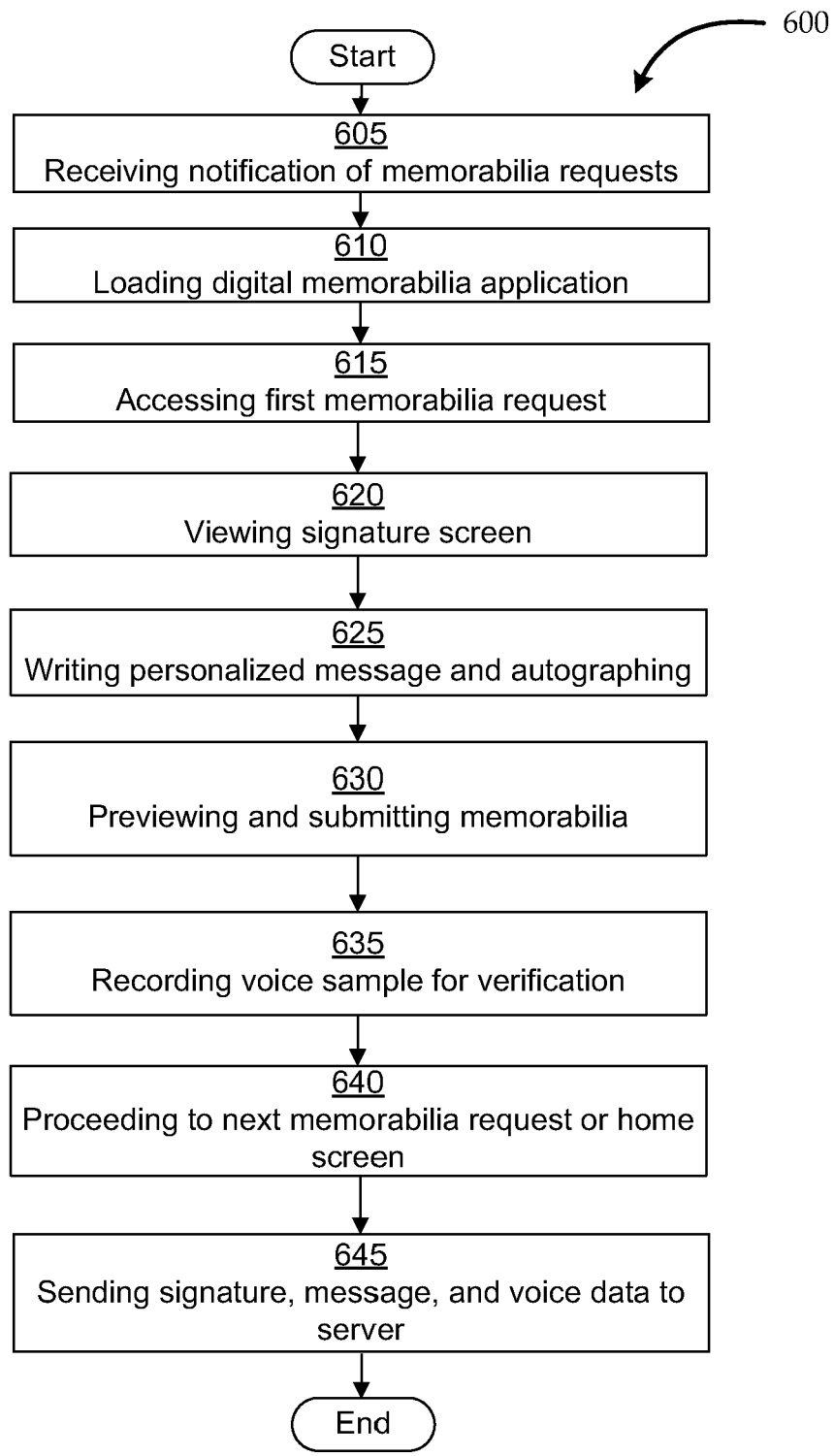
FIG. 6 is a flow diagram illustrating an exemplary method of generating digital memorabilia.
Figure 7:
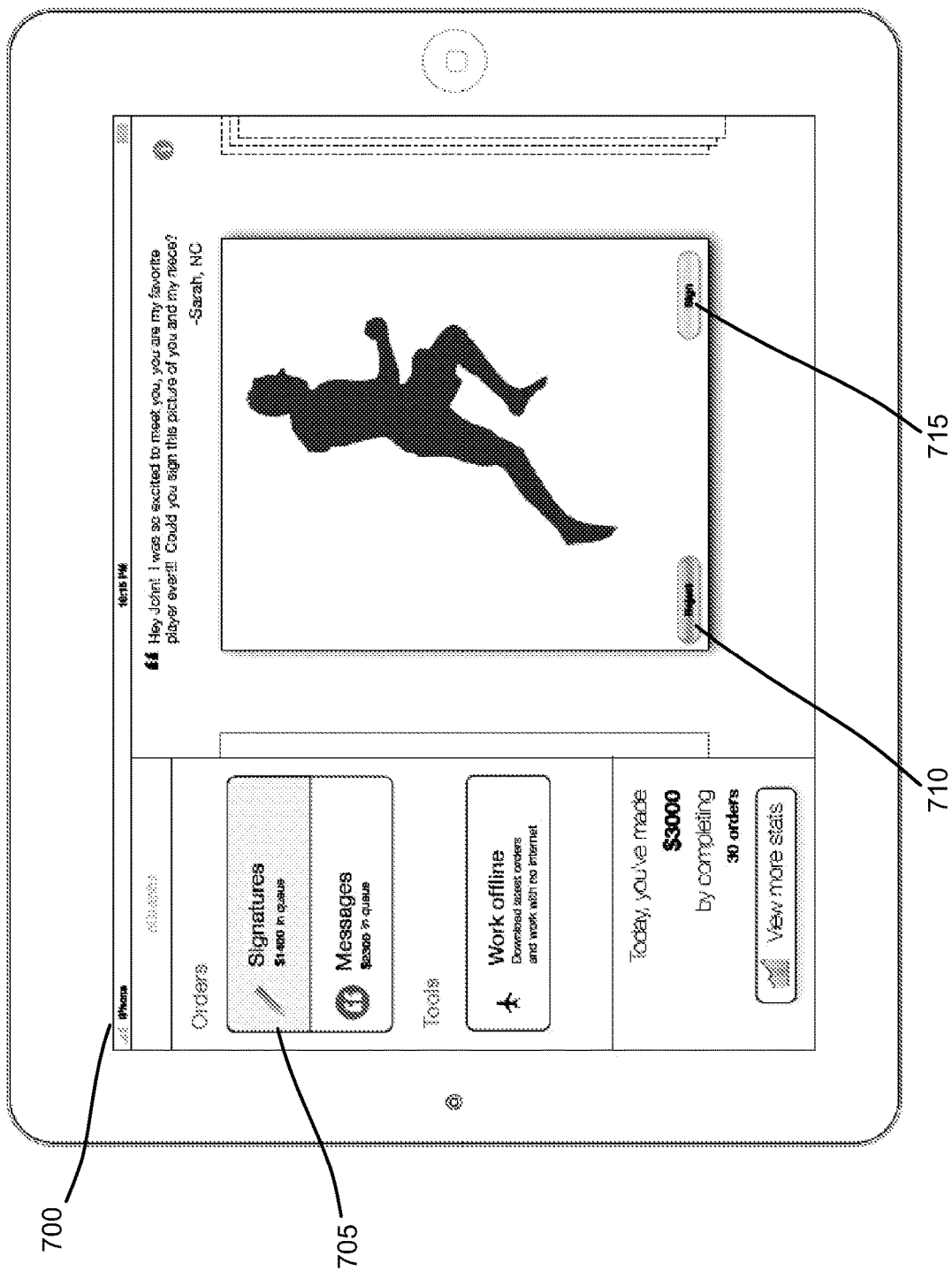
FIG. 7 illustrates an exemplary graphical user interface (GUI) displaying a digital memorabilia request.

FIG. 6 is a flowchart illustrating an exemplary method 600 for the signor to produce digital memorabilia. At step 605, the signor receives a notification that they have pending digital memorabilia to sign. Such a notification may be performed via email, through the mobile device application, text messaging, or other similar methods. In step 610, the signor opens the mobile device application and is taken to a home screen. At step 615, the signor may access the first digital memorabilia for signing from the home screen. An exemplary embodiment of a graphical user interface (GUI) 700 displaying the first digital memorabilia is shown in FIG. 7. The signor may view orders for digital memorabilia in queue by signatures 705. The signor may choose to reject 710 or sign 715 the digital memorabilia.

Figure 8:
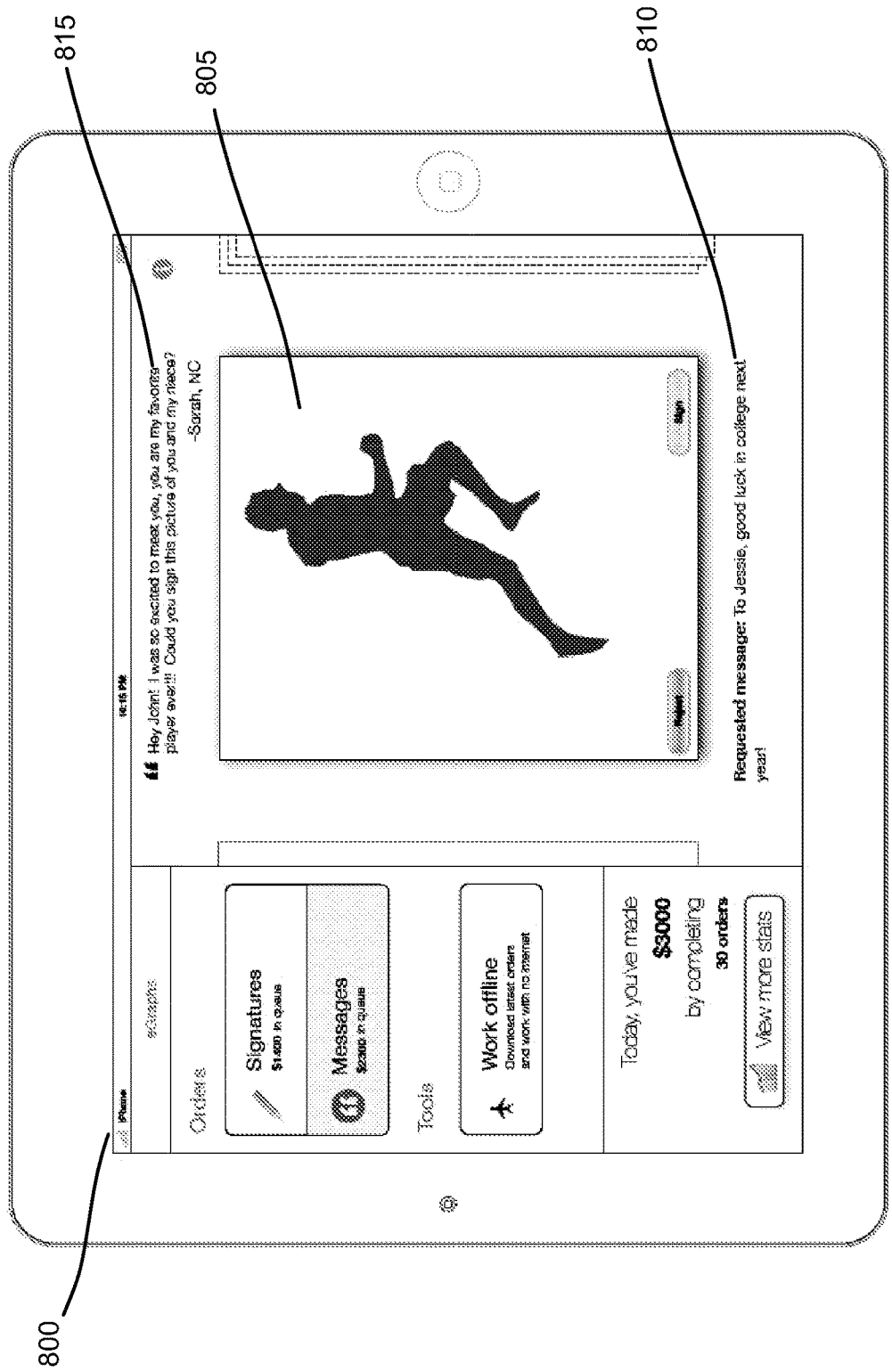
FIG. 8 illustrates an exemplary GUI displaying a digital memorabilia request and personal message.

Step 620 takes the signor to a signature screen where they are presented with an optional note from the customer and a personalized message for the signor to include with the autograph. An exemplary embodiment of a GUT 800 displaying the digital memorabilia 805 and personalized message 810 is shown in FIG. 8. The GUI 800 may also display a note 815 to the signor. Optionally, the signature screen may include a personalized message for the signor to verbally record (not shown). Alternatively, the personalized message for verbal recording may appear on a separate screen.

Figure 9:
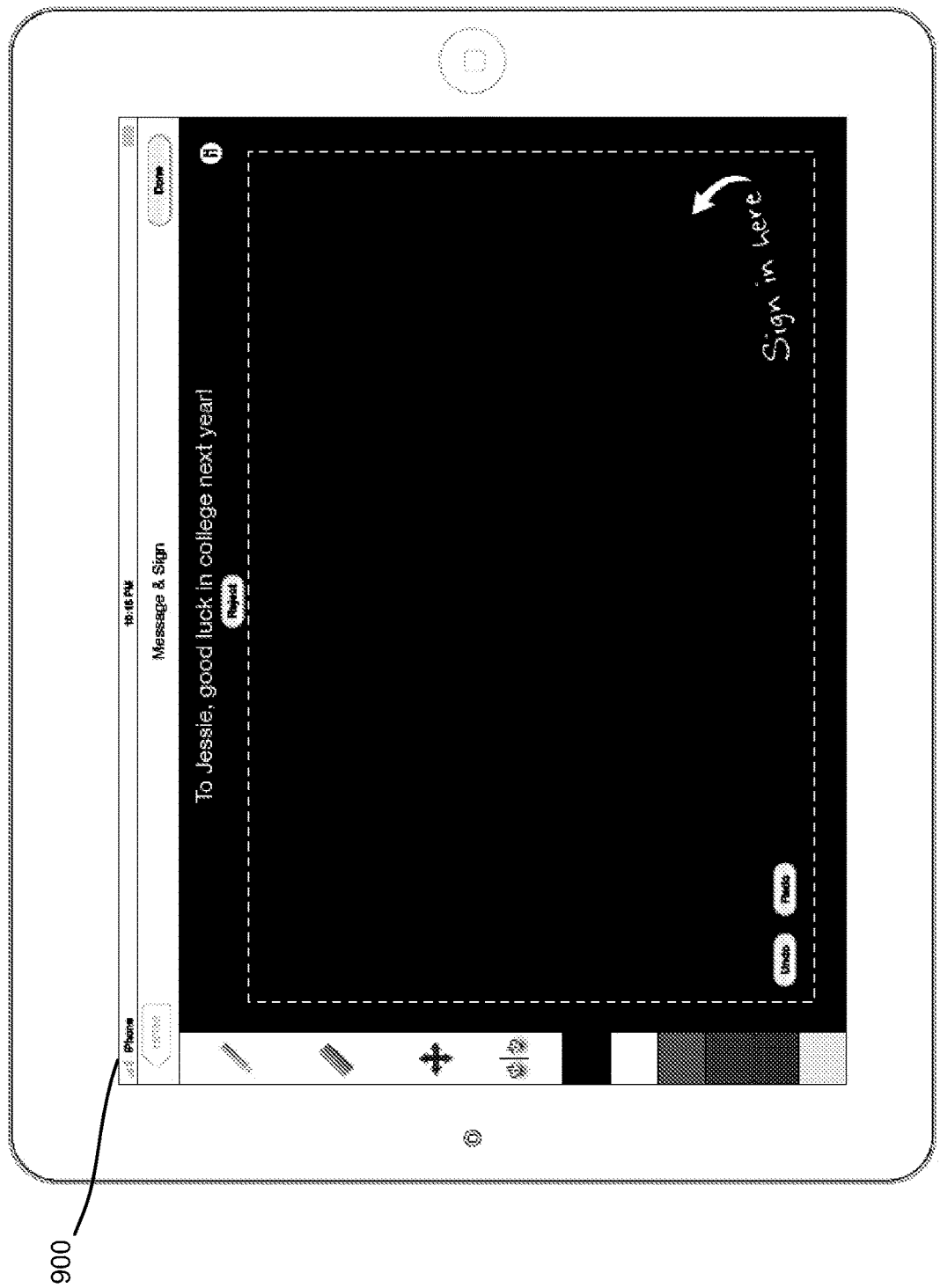
FIG. 9 illustrates an exemplary GUI for autographing.
Figure 10:
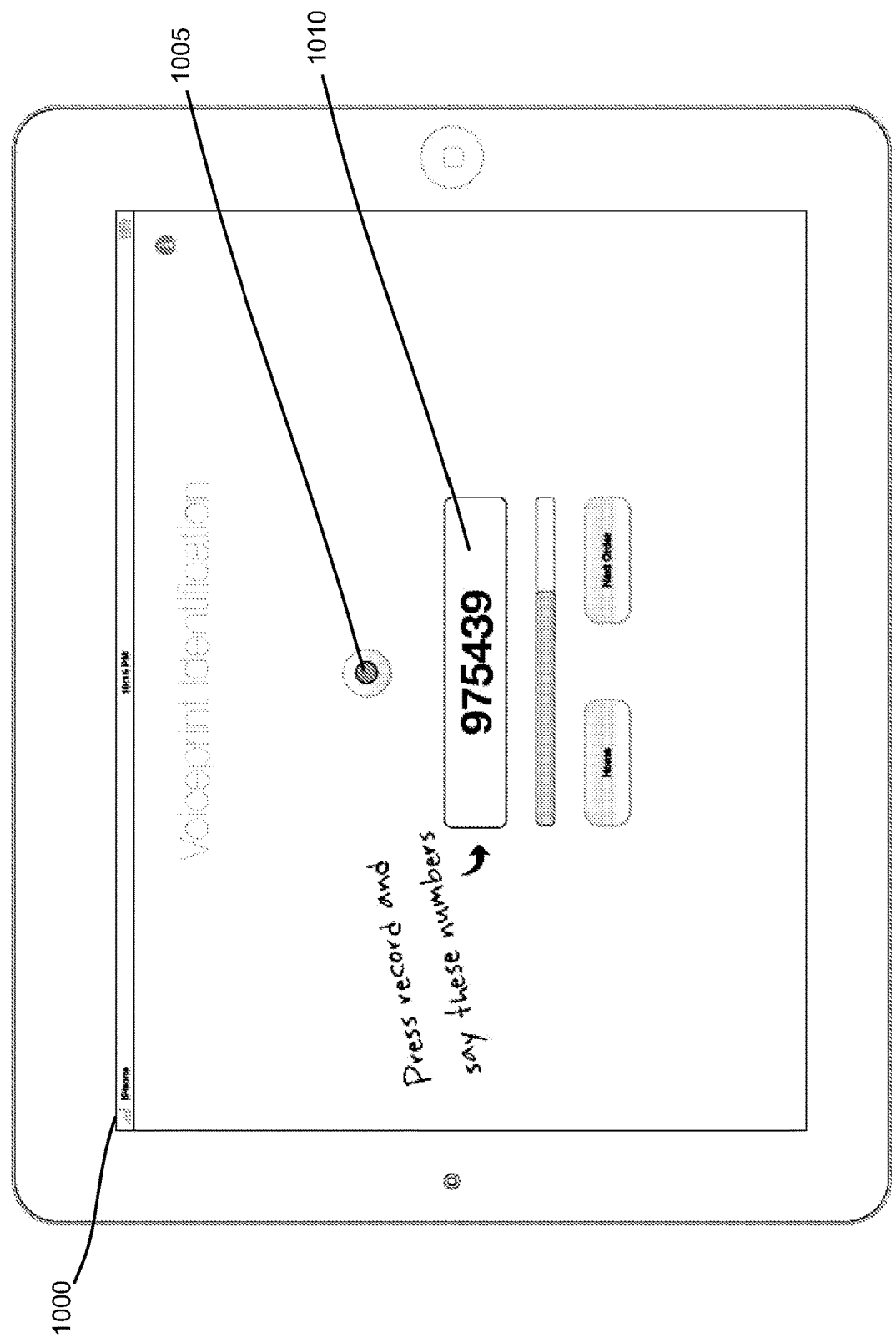
FIG. 10 illustrates an exemplary GUI for voice authentication.

The signor then writes the personalized message and signs the screen at step 625. FIG. 9 shows an exemplary embodiment of a GUI 900 for the signor to input the message and autograph. In step 630, the signor submits the message or signature and may preview the digital memorabilia or perform voice authentication. The signor authenticates his voice by recording a voice sample at step 635. The voice sample may be a prompt (e.g., a string of numbers, phrase, etc.) or the signor's choice of words. Optionally, if a personalized verbal message is requested, the verbal message may be used to perform voice authentication. FIG. 10 shows an exemplary embodiment of a voiceprint authentication GUI 1000. The signor may initiate the recording by using the record button 1005 and recite the prompt 1010. After providing the voice sample the signor may be redirected, at step 640, to the next pending signature or the home screen. The mobile device application sends the stored signature data and voice sample over the network 110 to the server 115 in step 645.

Figure 11:
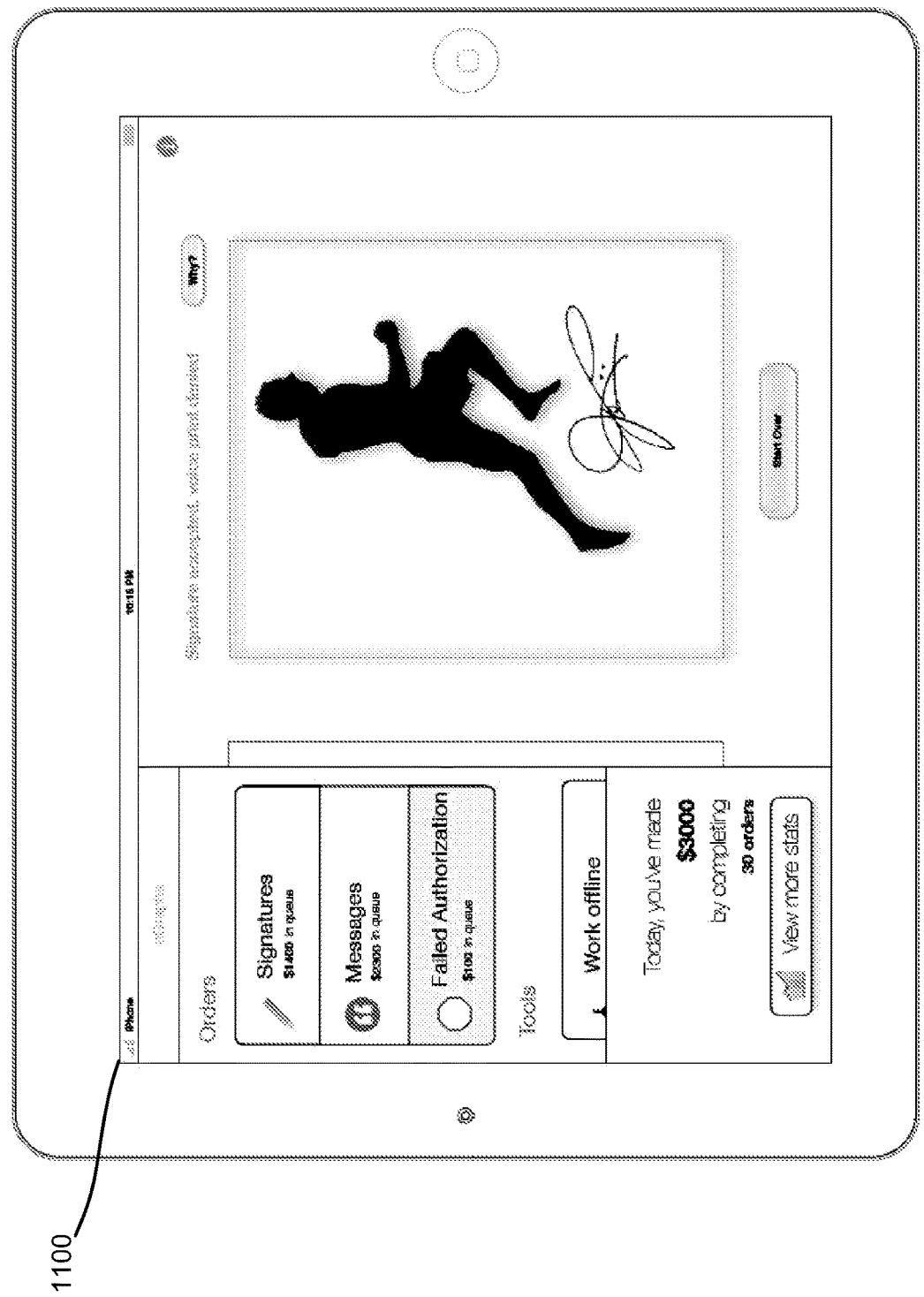
FIG. 11 illustrates an exemplary GUI displaying a failed authentication.

In one embodiment, if a signature or voice authentication check does not pass the verification system, a failed authorization may be displayed to the signor, as illustrated in the exemplary GUI in FIG. 11. The handwriting or voice authentication or verification may be performed in real time. Optionally, the authentication may be performed after the stored signature data and voice sample are sent to the server.

Figure 12:
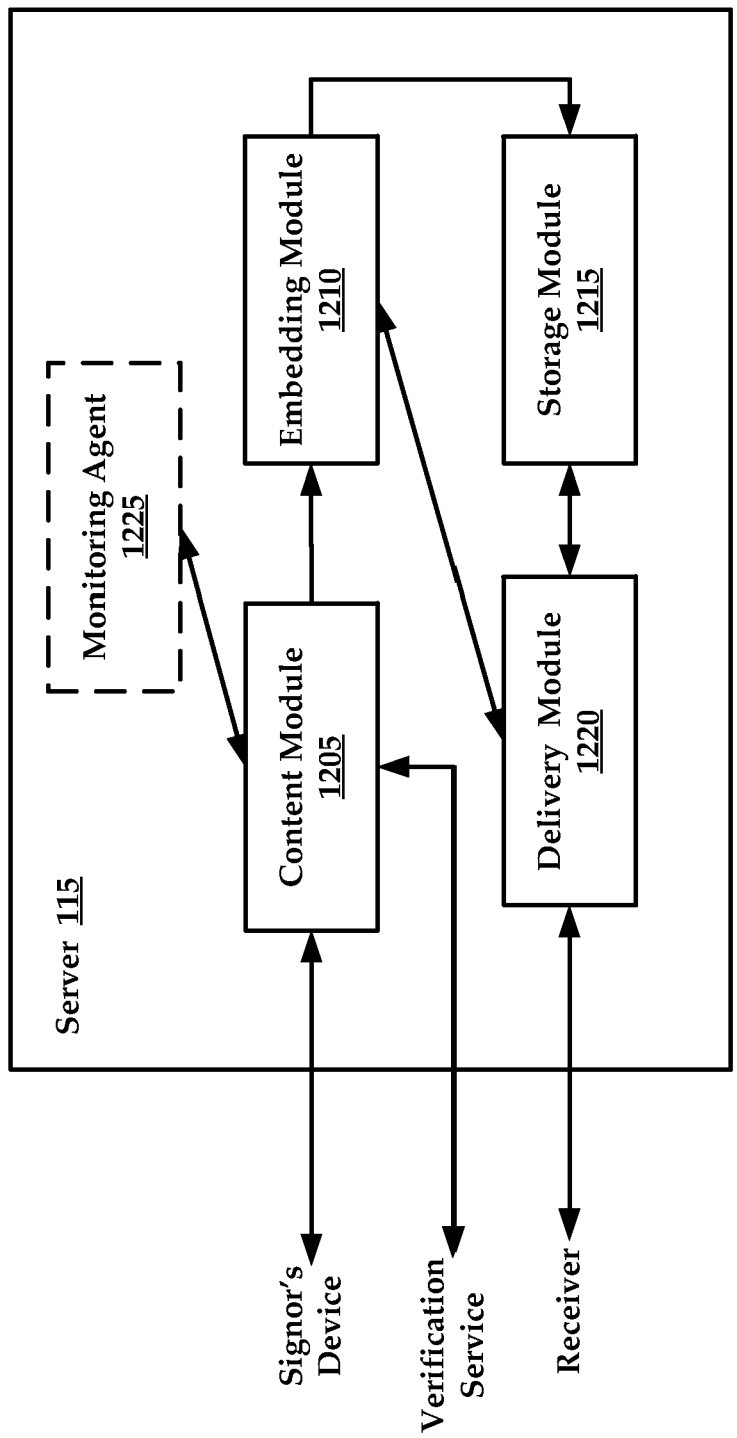
FIG. 12 illustrates a block diagram of an exemplary embodiment of a server comprising modules.

FIG. 12 illustrates an embodiment of a server 115 comprising modules for carrying out an embodiment of the present invention. As used herein, the term "module" may also refer to any of an application-specific integrated circuit (ASIC), an electronic circuit, a processor (shared, dedicated, or group) that executes one or more software or firmware programs, a combinational logic circuit, and/or other suitable components that provide the described functionalities. The server 115 may comprise a content module 1205, an embedding module 1210, a storage module 1215, and a delivery module 1220. The server 115 may also include an optional monitoring agent 1225. Additional physical components comprising a server are described in greater detail below in FIG. 16. The modules comprise instructions and may be stored in memory or on a mass storage device and executable by a processor.

The content module 1205 may provide a digital memorabilia signor (e.g., celebrity or athlete) with a digital item (e.g., a digital photograph). The content module 1205 may provide the digital item through a signor's mobile device application. The content module 1205 may also receive at least one electronic signature or an electronic written message from the digital memorabilia signor. The electronic signature or electronic written message may be associated with the sent digital photograph. Optionally, the content module 1205 may receive a voice message from the signor associated with the digital photograph. Optionally, the content module 1205 may send the electronic signature or electronic written message to a verification service. The verification service may generate a scoring number (e.g., a percentage) associated with a signor's identification verification. The scoring number may indicate the likelihood that the electronic signature or electronic written message is authentically produced by the signor. Alternatively, the content module, or another module on the server may perform the verification and generate the scoring number. The content module 1205 may also generate a certificate of authenticity for the digital photograph with the voice message, electronic signature, or electronic written message. The certificate of authenticity may include information as described above in FIG. 2.

The embedding module 1210 may embed an electronic signature or electronic written message from the signor into the digital photograph. Optionally, the embedding module 1210 may appropriately scale or render the electronic signature or electronic written message. Such scaling may be performed according to the vector scaling described above or by other similar methods.

The storage module 1215 may store the digital photograph with the voice message and the embedded electronic signature, electronic written message, or both.

The delivery module 1220 may deliver the digital photograph with the voice message and embedded electronic signature, electronic written message, or both to a digital memorabilia receiver (e.g., customer or owner). Optionally the delivery module 1220 may be configured to deliver digital memorabilia based in part on the scoring number. For example, if the scoring number indicates a low likelihood the electronic signature, electronic written message, or voice message is authentic, the delivery module 1220 may not deliver the digital memorabilia to the receiver. Scoring numbers that are above a threshold (e.g. 90%) indicating authenticity may allow the digital memorabilia to be delivered. The delivery module 1220 may also deliver the digital memorabilia comprising the digital photograph with the voice message and embedded electronic signature, electronic written message, or both depending on the approval of a monitoring agent. For example, if the electronic written message or voice message comprises prohibited content, the delivery module 1220 may prevent delivery of the digital memorabilia.

The optional monitoring agent 1225 may perform the monitoring interaction functions between signors (e.g., celebrities) and receivers (e.g., customers, fans, owners, etc.) as described above. The monitoring agent 1225 may also utilize pattern recognition or data mining to adapt or modify the monitored interaction to the signor's preference.

Figure 13:
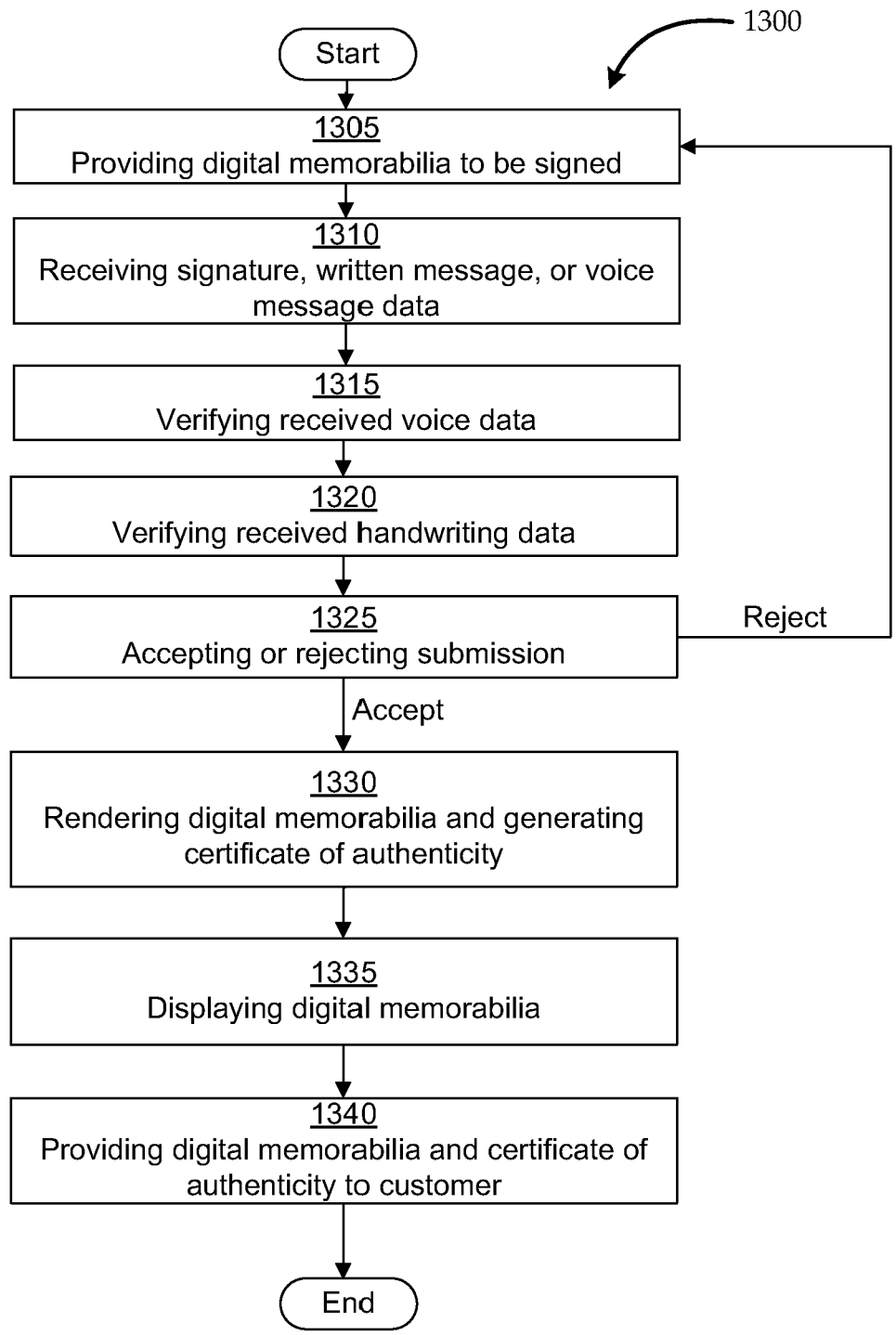
FIG. 13 illustrates a flow diagram of an exemplary method of generating digital memorabilia.

FIG. 13 illustrates an exemplary method 1300 of generating digital memorabilia. At step 1305, a server 105 may provide the digital item (e.g., a digital photo) to the signor. The digital item may be distributed through the content module 1205 as described in FIG. 12.

In step 1310, the server 105 may receive data for an electronic signature, a written message, or a voice message from the signor. At step 1315, the server 105 may verify the voice data against previously stored voice samples for the signor. The verification may return a scoring number that indicates the likelihood that the new voice sample is from the same person as the stored samples. As indicated above, the scoring number may be a percentage. Optionally, other similar scales may be used. The verification may optionally be performed by sending the voice data to a verification service.

In step 1320, the server 105 may verify the electronic signature or electronic written message against previously stored handwriting samples for the signor. Similar to the voice verification, a scoring number may be returned that indicates the likelihood that the new handwriting sample is from the same person as the stored samples.

At step 1325, the server 105 may determine whether to accept or reject the submission based on the combination of the scoring numbers from the voice and handwriting verification. If the scoring number combination is high enough to indicate the likelihood the signor personally generated the digital memorabilia, the submission is accepted as a valid or authentic digital memorabilia and the process proceeds to step 1330. If the scoring number combination indicates a low likelihood the signor personally generated the digital memorabilia, the submission is not accepted and may be returned to the signor to be re-performed, as shown in returning to step 1305.

In step 1330, the server 105 may render or embed the electronic signature or electronic written message from the signor into the digital photograph and generate a certificate of authenticity. The embedding may be performed by the embedding module 1210 and the certificate generation may be performed by the content module 1205 as described above in FIG. 12.

At step 1335, the server 105 may display the certificate of authenticity on a webpage as described above in FIG. 2, along with the rendered photograph (e.g., the digital photograph and embedded signature or message). In step 1340, the server 105 may email the customer with a link to both the rendered photograph and certificate of authenticity.

Once the customer is provided the verified digital memorabilia, they may take various actions through the website hosting the digital memorabilia. The customer may download multiple sizes of the digital memorabilia. Each size of the digital memorabilia may be re-rendered by the server to optimize the scale of the signature on the photograph as described above in FIG. 2. The customer may also view the certificate of authenticity, play the voice sample, or play back an animation of the signature redrawing. The customer may also create a shortcode URL as described in FIG. 2, to facilitate distribution and owner verification for friends. The computer may order physical prints of their digital memorabilia. The customer may one-click post the digital memorabilia to social networks (e.g., Facebook, Twitter, etc.)

Figure 14:
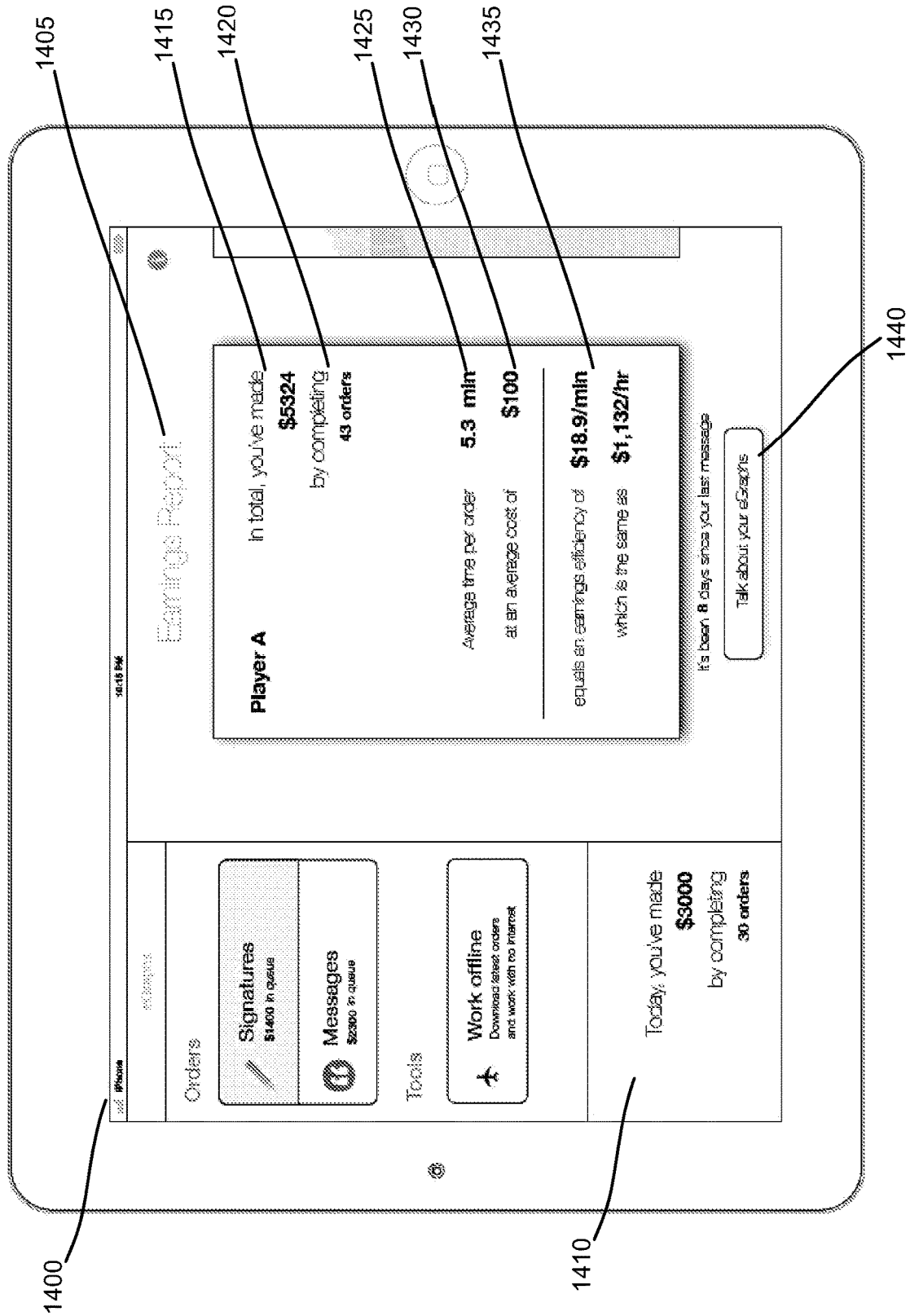
FIG. 14 illustrates an exemplary GUI of an earnings report.

FIG. 14 illustrates an exemplary GUI 1400 for displaying a signor's earnings report. The mobile device application may provide the signor with statistics in the form of an earnings report 1405. Optionally, the application may display the daily earnings and number of orders completed by the signor for the current day 1410. The earnings report 1405 may comprise the signor's total earnings amount 1415, the total number of orders completed 1420, the average time per order 1425, an average cost per order 1430, and a signor's earnings efficiency 1435. Optionally, the application may serve as a platform to allow the signor to interact with customers or fans by posting messages 1440.

Figure 15:
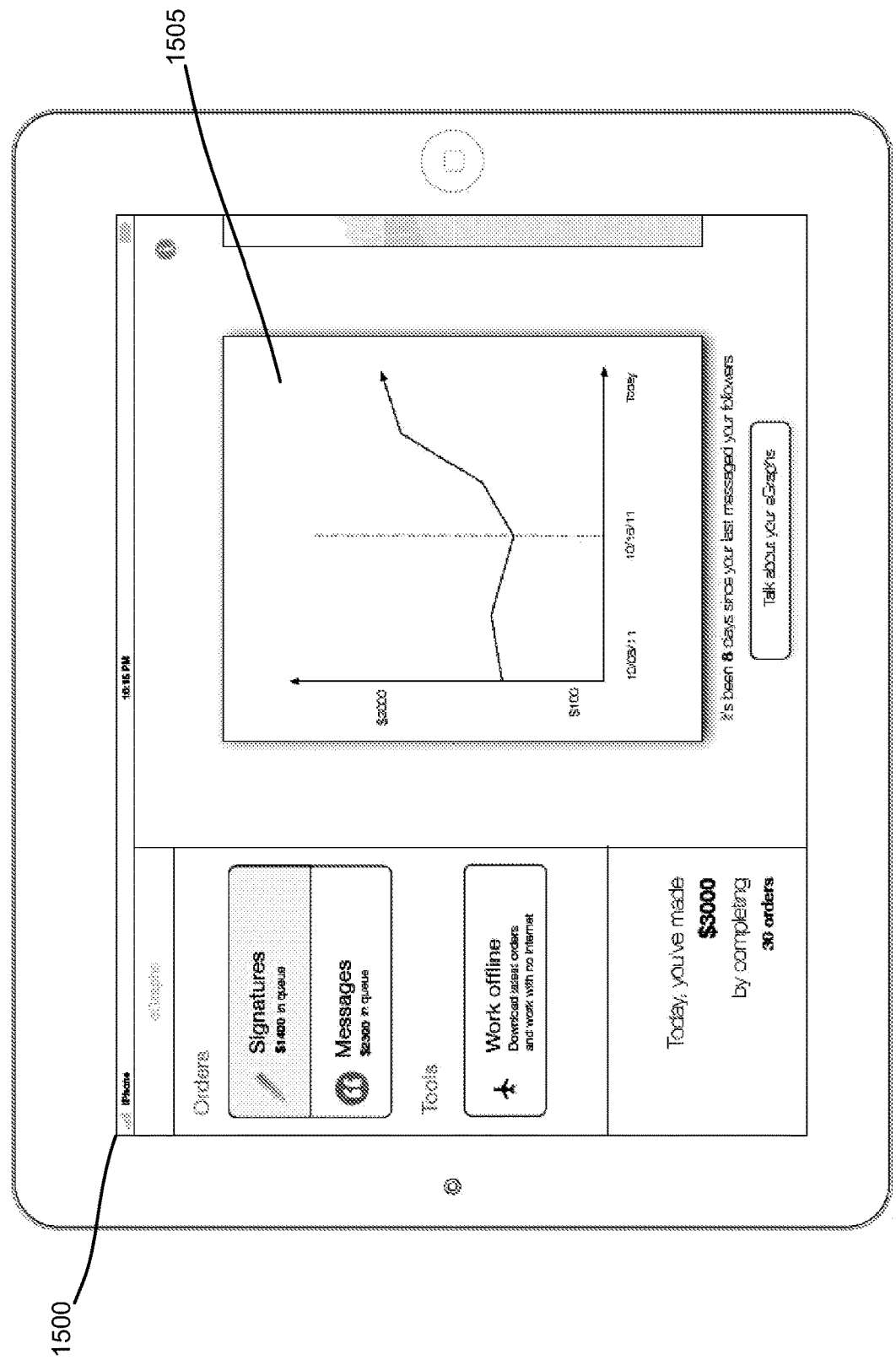
FIG. 15 illustrates an exemplary GUI of an earnings chart.

FIG. 15 illustrates an exemplary GUI 1500 providing a visual indication 1505 of a signor's earnings (e.g., using a chart, graph, etc.). The signor's or celebrity's earnings or share of revenue may be distributed monthly via direct deposit, mailed check, or other similar form of payment. Revenue distribution may also utilize a period of times (e.g. bi-monthly, quarterly, etc.) or milestones (e.g., predetermined revenue amounts, number of orders completed, etc.). Optionally, the service may employ measures to protect against fraud and returns. For example, holding accrued earnings for a period of time (e.g., 30 days).

Figure 16:
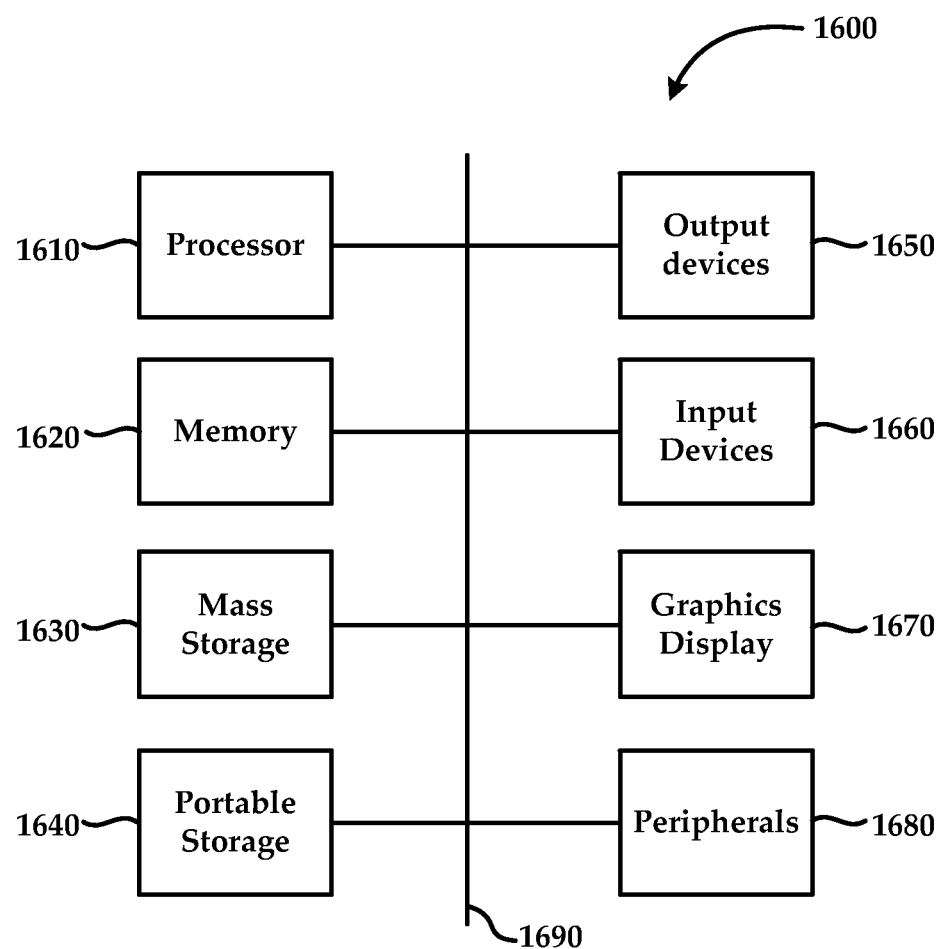
FIG. 16 illustrates a block diagram of an exemplary computing device.

FIG. 16 illustrates an exemplary computing system 1600 that may be used to implement, for example, mobile device 105, server 115, or customer device 125. Computing system 1600 of FIG. 16 may be implemented in the contexts of the likes of computing systems, networks, servers, or combinations thereof. Computing system 1600 includes one or more processors 1610 and memory 1620. Memory 1620 stores, in part, instructions and data for execution by processor 1610. Memory 1620 may store the executable code when in operation. Computing system 1600 further includes a mass storage device 1630, portable storage device(s) 1640, output devices 1650, user input devices 1660, a graphics display 1670, and peripherals 1680.

The components shown in FIG. 16 are depicted as being connected via a single bus 1690. The components may be connected through one or more data transport means. Processor 1610 and memory 1620 may be connected via a local microprocessor bus, and mass storage device 1630, peripheral device(s) 1680, portable storage device 1640, and graphics display 1670 may be connected via one or more input/output (I/O) buses.

Mass storage device 1630, which may be implemented with a magnetic disk drive or an optical disk drive, is a non-volatile storage device for storing data and instructions for use by processor 1610. Mass storage device 1630 may store the system software for implementing embodiments of the present invention for purposes of loading that software into memory 1620.

Portable storage device 1640 operates in conjunction with a portable non-volatile storage medium, such as a floppy disk, compact disk, digital video disc, USB storage device, and secure digital (SD) memory card (e.g., SD, miniSD, and microSD), to input and output data and code to and from the computer system 1600. The system software for implementing embodiments of the present invention may be stored on such a portable medium and input to the computer system 1600 via the portable storage device 1640.

Input devices 1660 provide a portion of a user interface. Input devices 1660 may include an alphanumeric keypad, such as a keyboard, for inputting alpha-numeric and other information, or a pointing device, such as a mouse, a trackball, stylus, or cursor direction keys. Input devices 1660 may also include a touchscreen. Additionally, computing system 1600 includes output devices 1650. Suitable output devices include speakers, printers, network interfaces, and monitors.

Graphics display 1670 may include a (touch) liquid crystal display (LCD) or other suitable display device. Graphics display 1670 receives textual and graphical information, and processes the information for output to the display device.

Peripherals 1680 may include any type of computer support device to add additional functionality to the computer system. Peripherals 1680 may include a GPS navigation device, (GSM) modem, satellite radio, router, and the like.

The components provided in computer system 1600 are those typically found in computer systems that may be suitable for use with embodiments of the present invention and are intended to represent a broad category of such computer components that are well known in the art. Thus, computer system 1600 may be a personal computer, handheld computing system, phablet, tablet, telephone, smartphone, mobile computing system, workstation, server, minicomputer, mainframe computer, or any other computing system. The computer may also include different bus configurations, networked platforms, multi-processor platforms, etc. Various operating systems may be used including Unix, Linux, Windows, Mac OS, Palm OS, Android, iOS (known as iPhone OS before June 2010), QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), Blu-ray Disc (BD), any other optical storage medium, RAM, PROM, EPROM, EEPROM, FLASH memory, and/or any other memory chip, module, or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. It will be recognized that the terms "comprising," "including," and "having," as used herein, are specifically intended to be read as open-ended terms of art. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A system for generating digital memorabilia, the system comprising: a memory for storing executable instructions; a processor for executing the executable instructions, the executable instructions comprising: a content module that: provides a digital memorabilia signor with a digital item; receives an electronic signature, an electronic written message, or a combination thereof from the digital memorabilia signor, and an embedding module that embeds the electronic signature, the electronic written message, or the combination thereof from the digital memorabilia signor into the digital item thereby generating digital memorabilia; optionally a storage module that stores the digital memorabilia; and a delivery module that delivers the digital memorabilia to a digital memorabilia receiver, wherein: the content module sends the electronic signature, the electronic written message, or the combination thereof to a verification service that verifies authenticity of the electronic written message, the electronic signature, or the combination thereof by generating a scoring number associated with signor identification verification in which the electronic signature or the electronic written message must achieve at least a 90% confidence level based on an X,Y array coordinates including a statistical comparison of velocity between coordinates and relative position of points between coordinates.

2. The system of claim 1, in which the delivery module delivers the digital memorabilia to the digital memorabilia receiver based at least in part on the scoring number.

3. The system of claim 1, the processor further comprising executable instructions for a monitoring agent that monitors the electronic signature, the electronic written message, or the combination thereof.

4. The system of claim 1, wherein the content module further comprises executable instructions to generate a certificate of authenticity for the digital memorabilia for delivery to a digital memorabilia receiver.

5. The system of claim 4, the processor further comprising executable instructions for the delivery module to deliver the certificate of authenticity to a digital memorabilia receiver.

* * * * *